Patented June 5, 1934

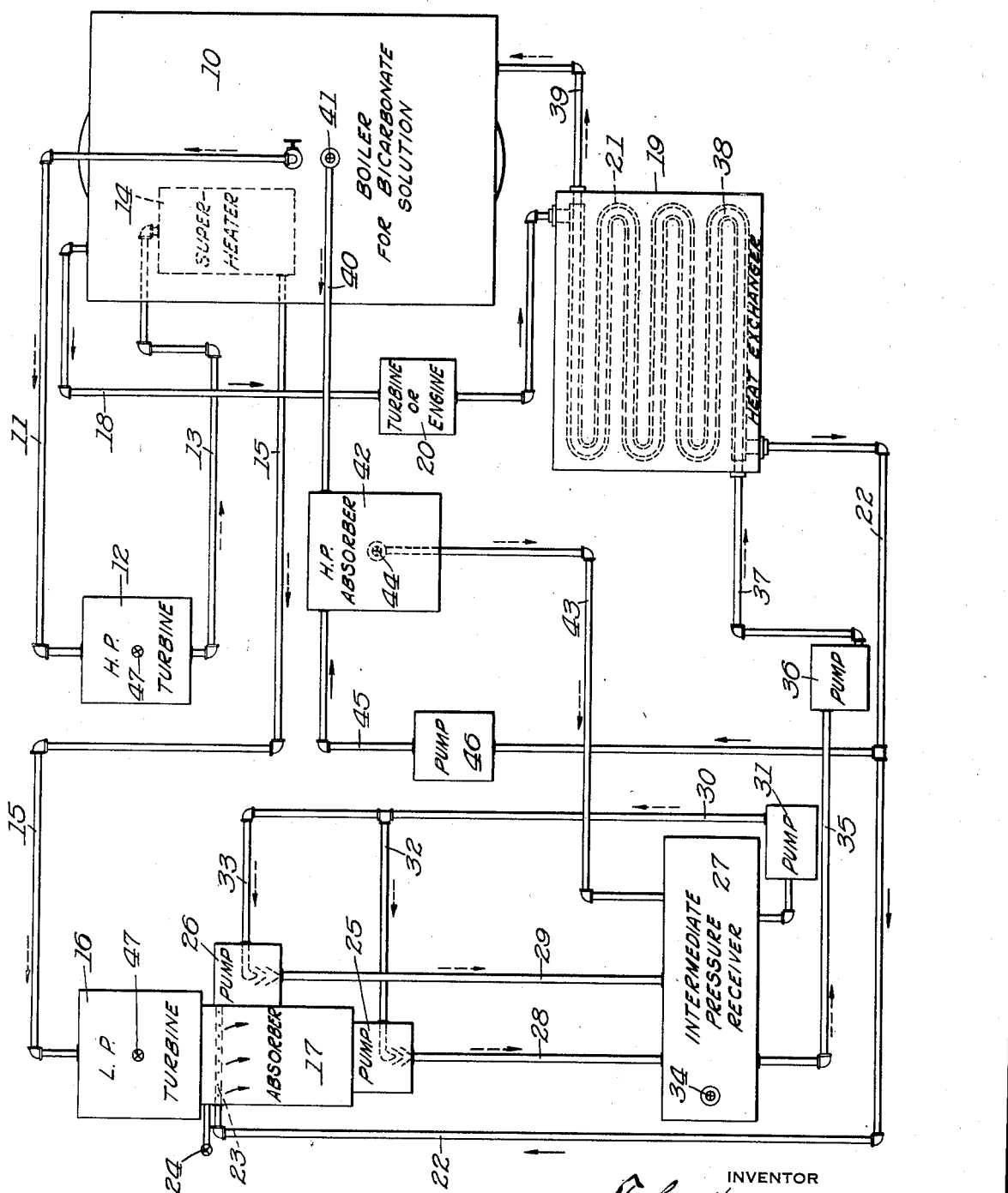

1,961,292

UNITED STATES PATENT OFFICE 1,961,292

METHOD OF AND APPARATUS FOR GENERATING AND APPLYING MOTIVE POWER

Thomas L. Hartman, Pittsburgh, Pa., assignor to National Valve & Manufacturing Company, trustee, a corporation of Pennsylvania Application August 21, 1928, Serial No. 301,106

7 Claims. (Cl. 60—37)

This invention relates to a method of producing or generating power, and to a plant in which the method may be practiced or carried out.

My invention is generally aimed to provide a method and means which effect a material saving in the quantity of fuel necessary for the production of motive power and which is more compact, economical in cost of production, installation, and upkeep generally, and in which the number and size of the necessary boilers are reduced, as compared with the same capacity steam motive power generating plants.

A prime object is to provide a method and means wherein the motive vapors are not condensed or liquefied in any part of the system, so that there will be no loss of the latent heat of vaporization.

Further objects are to provide a method and means wherein heat contained in the exhaust motive vapors and the carrier solution is retained in the cycle, and wherein the exhaust motive vapors are chemically combined with a carrier compound. This combining or reaction produces a new chemical compound in which the weight of exhaust vapors, chemically combining with a given amount of carrier compound, are the same for vacuum or pressure conditions in the low pressure side of the system. My invention also contemplates separating the motive vapors from the new chemical or carrier compound by heat.

Additional objects are, to provide a method and means wherein the heat of absorption and/or the heat of reaction, which include latent heat and the heat of solution, are retained in the cycle and are not lost as is the case in the well known ammonia and water cycle methods.

In the practice of my invention, I employ a motive gas which is at all times and throughout the cycle in the superheated state and employ a carrier compound that is capable or reacting with said superheated gas.

Another important object is to provide a means and method wherein the foregoing objects and advantages, with others, may be attained through the use of chemicals when used in the form of a gas for application to work and subsequent absorption by a carrier solution, from which it is driven off by heat for a further cycle of operation, the materials being preferably carbon-dioxid as the gas and a carbonate solution which, by absorption of said gas produces a bicarbonate solution.

Various additional objects and advantages will become apparent and in part be pointed out in the following description taken in connection with the accompanying drawing, in which the single view illustrates my novel power plant diagrammatically.

Referring specifically to the drawing, 10 designates a boiler or heater, which may be of any desired type, as for instance, a commercial steam boiler. The heater or boiler 10 is adapted to heat a chemical compound in solution which, when comparatively cool, is adapted to absorb or carry a gas therein in chemical combination therewith, but which, upon a suitable increase in temperature, is adapted to liberate or evolve such gas, leaving a residual solution or salt identical with the original solution or salt with which the gas combined to form the compound. This carrier or basic solution is preferably a water solution of sodium carbonate, potassium carbonate, or barium carbonate, while the gas is preferably carbon dioxid. The exact quantity of gas which will combine with one of said carbonate solutions depends upon the particular carbonate solution, the amount of carbonate present, its temperature, the reactivity of the gas therewith, and the temperature of the latter.

A gas pipe or conduit 11 leads from the boiler 10 to a high pressure turbine 12, and another pipe or conduit 13 returns from the turbine 12 to a super-heater 14, which latter is arranged within the boiler 10. A pipe 15 leads from superheater 14 to a low pressure turbine 16, which is in communication with an absorber 17.

A pipe or conduit 18 also leads from boiler 10 to convey a carbonate solution separated from the carbon-dioxid vapor to a temperature equalizer or heat exchanger 19. In the line of conduit 18, a turbine or engine 20 is disposed, which will operate because of the fluid passing therethrough. This element 20 particularly serves to reduce the pressure of the liquid to that required in the absorber 17. Application of this pressure to the turbine or engine is an example of its conversion into work rather than being lost.

A pressure reducing valve may be employed instead of the element at 20, if loss of the excess pressure is to be disregarded. A coil 21 within the heat exchanger 19 receives the residue fluid from the pipe 18, the same traveling in a downward direction to a conduit 22 in communication with the coil 21 which discharges it into the absorber 17 through a series of nozzles 23. A normally closed valve-controlled filling nozzle 110

24 is connected to the absorber 17, for introducing solutions and vapors.

Absorber 17 is in communication with pumps 25 and 26, and the latter are in communication with an intermediate pressure receiver 27, through conduits or pipes 28 and 29, respectively. A conduit or pipe 30 having a pump 31 therein leads from receiver 27 to the pumps 25 and 26 through branches 32 and 33, respectively. Receiver 27 has a normally closed air vent or pop valve 34 arranged for operation automatically to release air should it be trapped in said receiver, and which might, in some instances, leak in through the absorber 17, if the latter is subject to a vacuum created by pump 26. A recombination of the carbon dioxide and the residual fluid or solution as illustrated, is effected by spraying said solution into the absorber 17 at a temperature inducive to chemical reaction thereof with the carbon dioxide gas to form the bicarbonate solution. The action in absorber 17 produces a chemical combination which completely utilizes all the gas present, the relative proportions being at least such that sufficient carrier solution is thereby provided so that all the carbon dioxid is converted by the subsequent reaction. This reaction may be effected by introducing initially into the absorber a predetermined amount of water and potassium carbonate, $K_2CO_3$, or its equivalent, thereby forming a solution of potassium carbonate, which becomes the carrier solution. When motive means in the form of carbon dioxid gas is introduced into said solution in said absorber, a reaction occurs whereby all the carbon dioxid present reacts with the carrier solution to form a potassium bicarbonate solution. This reaction may be graphically represented as follows:

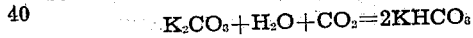

$$K_2CO_3 + H_2O + CO_2 = 2KHCO_3$$

Inasmuch as, therefore, the whole action is one purely of chemical combination, there is no merely mechanical mixture and no purely physical absorption or solution occurring, nor any more physical change in the state or phase of the gas, such as condensation or liquefaction.

It follows, therefore, that the equation is completely reversed in boiler 10 and that the only change which occurs is that of re-formation or re-evolution of the carbon dioxid gas with the concomitant change naturally of the bicarbonate to the normal carbonate again. This may be graphically represented by the following:

$$2KHCO_3 = K_2CO_3 + H_2O + CO_2$$

As the chemist knows, a reaction which gives off a gas can be run to completion under favorable conditions. The evolution of the carbon dioxid, therefore, may be as complete as was its absorption and no gas is lost in the cycle or system which is a closed one.

In practice, the motive gas from the engine is exhausted into the absorber where it comes into direct contact with the residual solution from the generator. It will be understood, of course, that the motive gas in passing through the engine is reduced in temperature and that this exhaust gas temperature is controlled to a degree which is inducive to reaction when considering the temperature of the residual solution. Further, that the hot residual solution from the generator is reduced in temperature in passing through the heat exchanger. The heat exchange is controlled so that the temperature of residual solution entering the absorber is inducive to reaction with the exhaust motive gas.

The motive gas entering the absorber has a definite molecular structure. The residual solution entering the absorber also has a definite molecular structure, and when these two different molecular structures react with each other, there is produced a new molecular structure. The latter formed in and leaving the absorber does not contain any molecules of the motive gas which retain their original molecular structure. This is due to the fact that the reaction is a complete chemical reaction, as distinguished from a part chemical and a part physical action. In other words, there is no excess of carbon dioxid over and above the chemical equivalent called for by the appropriate reaction above. Therefore, in forming the potassium bicarbonate in absorber 17, the amount of carbon dioxid present is not in excess of the proportion of one gram-molecular weight of gas to one gram-molecular weight of potassium carbonate, or a numerical ratio represented by 44 divided by 138.192.

Under my method, all of the exhaust motive gas in re-acting with the residual solution from the generator retains its gaseous state, and with the proper temperature of the exhaust motive gas and residual solution, it is possible to control the heat of reaction in the absorber so that the same is not lost to the cycle. Also, the weight of exhaust motive gas in the absorber reacting at a given temperature and with a given amount and concentration of residual solution is equal for pressures under or above atmospheric pressure.

From receiver 27, a return pipe or conduit 35 leads to a pump 36, and from the latter a pipe or conduit 37 leads to a coil 38 contained within the coil 21 and whose pipe is of less cross sectional area than the bore of the pipe forming the coil 21. The bicarbonate solution in pipe 37 passes from the bottom toward the top of the heat exchanger, that is, in the opposite direction to the flow of the residue in pipe 18. From the top of coil 38, a pipe or conduit 39 returns to the boiler 10.

Another pipe 40 leads from the top of the boiler 10 and is adapted to receive gas therefrom when above an excessive predetermined pressure. The admission of the gas is under control of a safety valve 41, which is adapted to normally remain in and seek a closed position and open only upon an excessive predetermined pressure. Pipe 40 leads to a high pressure receiver or absorber 42 which is in communication with the receiver 27 by way of a pipe or conduit 43 having an automatically opening valve 44 therein adapted to normally seek an open position. Tank 42 is also in communication with the pipe 22 by way of a pipe or conduit 45 which has a pump 46 therein.

Each of the turbines 12 and 16 may have a normally closed valve 47 adapted to operate automatically upon a predetermined excessive pressure to release the same into the atmosphere.

To follow operation of the apparatus and carry out my improved method, a water solution of bicarbonate of sodium, bicarbonate of potassium, or bicarbonate of barium, of the appropriate concentration, is supplied to the apparatus through the connection 24. If desired, however, the above mentioned chemicals in the carbonate form, in place of the bicarbonate form, may be employed. In this case, the superheated carbon-dioxid gas is also charged into absorber 17 through connection 24 and, therefore, forms the aforesaid chemicals in the bicarbonate form in the absorber. This chemical reaches the boiler 10 through operation of pump 36, by passing through absorber 17, pump 25, pipe 28, the receiver 27, pipe 35, pump 36, pipe 37, coil 38, and pipe 39. It is to be realized that the system or apparatus is completely closed against the admission of atmospheric air.

The boiler 10 being fired, the chemical or bicarbonate solution mentioned is heated so that gas is driven off, which is superheated carbon-dioxide, and leaves the boiler under high pressure, through the pipe 11 to turbine 12, expanding therein and driving the latter, so that the power may be applied to any desired work. The exhaust carbon-dioxide gas from the turbine 12 passes through a pipe 13 to the superheater 14, and then passes through the pipe 15 under pressure to the low pressure turbine 16, driving the latter so that its power may also be applied to any useful work. With the absorber 17 operating, a low pressure is created and causes the turbine 16 to operate against a low back pressure.

As the carbon-dioxide gas is driven off in the boiler 10, the liquid residue passes from such boiler under considerable pressure through the pipe 18 to the turbine or engine at 20, which primarily serves the purpose of reducing the pressure of such residue to that required at the absorber 17, although applying the excess pressure to work. The residue mentioned, thus reduced in pressure, passes from turbine 20 into the coil 21 and thence into the pipe 22, and discharges therefrom relatively cool through the nozzles 23 into the absorber 17 at the zone where it receives gas from turbine 16. Such residue in the element 17 absorbs the gas which is discharged into the same from the turbine 16 by combining therewith, and thus serves as a vehicle to convey such gas or vapor back to the boiler 10, so that it may be again driven off and the operation of the apparatus be continued in successive cycles so long as sufficient heat is applied at the boiler. It will be realized from the foregoing that a chemical reaction takes place in the absorber 17 in that the absorption of the superheated carbon-dioxide gas by the relatively cool (with respect to the temperature of the solution leaving the heater 10) carbonate of sodium, carbonate of potassium, or carbonate of barium forms bicarbonate of sodium, bicarbonate of potassium, or bicarbonate of barium, as the case may be.

The bicarbonate solution from absorber 17 through the action of pump 25 passes through pipe 28 into the intermediate pressure receiver 27, and from the same through conduits 35 and 37, through the action of pump 36, and is passed through the coil 38 and conduit 39, from which it returns into the boiler 10. The heating of the bicarbonate solution in such boiler separates or drives off the carbon-dioxid as gas for return passage through the apparatus, initiated at the pipe 11, while the liquid residue, which is carbonate of sodium, carbonate of potassium, or carbonate of barium, returns through the pipes and the course previously traced.

It is to be realized that the carbonate solution between the boiler 10 and absorber 17 is materially reduced in temperature and enters the absorber 17 comparatively cool, and hence the bicarbonate solution, passing through the coil 38, is comparatively cool. As this solution passes through the heat exchanger in the opposite direction to the carbonate solution passing therethrough, the carbonate solution is accordingly reduced in temperature, or comparatively cooled. While the carbonate solution passing through the heat exchanger 19 is cooled, its heat is transferred to the bicarbonate solution returning to the boiler 10. The two solutions, therefore, exchange or substantially equalize their temperatures.

In the event of undue pressure within the boiler 10, carbon-dioxid gas will, in addition to passing through the pipe 11, open the automatic valve 41 and pass through conduit 40 to the receiver 42. At this time, valve 44 will close and pump 46 will be in operation and will pump a limited quantity of carbonate solution from the pipe 22 through conduit 45, into the absorber 42, in which a chemical action will take place as in the absorber 17, with the liquid carbonate absorbing the gas and forming a bicarbonate solution. When the pressure falls to the pressure in receiver 27 due to the absorption in receiver 42, valve 44 automatically opens so that the bicarbonate solution passes through the pipe 43 into the receiver 27.

Pump 46 may be controlled in any desired manner, but as it should operate only when carbon-dioxid gas is within the absorber 42, any appropriate connection may be made to automatically start and stop it, for instance, from a source of electrical energy, with switch mechanism, not shown, under control of valve 44 or the pressure within the absorber 42. Pumps 31 and 36 may also be electrically operated, if desired, and controlled in any appropriate manner.

The pumps 25 and 26 are preferably of the jet type. They may be electrically operated feed pumps, if desired, but, as shown, are adapted for operation by the pressure and flow of bicarbonate solution therethrough, being taken from receiver 27 by pump 31 and discharged through conduit 30 and then from branches 32 and 33 to the pumps 25 and 26 respectively. This bicarbonate solution is not wasted, but returns from said pumps through the pipes 28 and 29, respectively, to receiver 27.

It is obvious that, if desired, the high pressure turbine 12, super-heater 14, and their connections 13 and 15 may be omitted, in which event, the pipe 11 would connect directly to and discharge into the turbine 16.

Various changes may be resorted to, provided they fall within the spirit and scope of the invention.

I claim:

1. The herein described method of generating and applying motive power in a closed system, which consists in separating by heat carbon-dioxid gas and a residual from a chemical applying the said separated gas to work, and thereafter effecting a recombination chemically of all the gas with the residue to restore the aforesaid chemical to its original character for re-use in succeeding cycles of operation.

2. The herein described method of generating and applying motive power in a closed system, which consists in separating by heat carbon-dioxid gas and a residual from a chemical, applying the separated gas to work, and thereafter effecting a chemical re-combination of the gas with the residue from such separation to restore the aforesaid chemical to its original character for re-use in succeeding cycles of operation, characterized in that the weight of the gas re-combining is uniform regardless of pressure.

3. The herein described method of generating and applying motive power in a closed system, which consists in separating by heat superheated carbon-dioxid gas and a residual from a chemical, applying the separated gas to work, and thereafter effecting a chemical re-combination of the superheated gas with the residue from such separation to restore the aforesaid chemical to its original character for re-use in succeeding cycles of operation, characterized in that the weight of the combining gas is uniform for any re-combination pressure to which it is subjected, and that the heat of recombination is retained in the cycle.

4. The herein described method of generating and applying motive power, which consists in separating by heat gas and a residual from a bicarbonate solution, applying the said separated gas to work, and thereafter effecting a re-combination chemically of all the gas with the residue to restore the aforesaid chemical to its original character for re-use in succeeding cycles of operation.

5. The herein described method of generating and applying motive power, which consists in separating by heat carbon-dioxid gas and a residual from a bicarbonate solution, applying the said separated gas to work, and thereafter effecting a re-combination chemically of all the gas with the residue to restore the aforesaid chemical to its original character for re-use in succeeding cycles of operation.

6. The steps of dissociating the major portion of a suitable bicarbonate by heating the whole bicarbonate until carbon dioxid is completely evolved from said major portion and corresponding normal carbonate formed, extracting work from said carbon dioxid, and then causing all of said carbon dioxid to recombine into the original bicarbonate.

7. The steps of dissociating by heat the major portion of a bicarbonate selected from the following: sodium bicarbonate, potassium bicarbonate, and barium bicarbonate; until carbon dioxid gas is evolved from said portion and corresponding normal carbonate formed, extracting work from said carbon dioxid and recombining chemically said carbonate and all of said gas into the original bicarbonate.

THOMAS L. HARTMAN.